United States Patent Office 3,439,014
Patented Apr. 15, 1969

3,439,014
SILICON HYDRIDE-OLEFIN ADDITION
Robert Patton, Saltcoats, Scotland, and Edward Keith Pierpoint, Liverpool, England, assignors to Imperial Chemical Industries Limited, London, England, a corporation of Great Britain
No Drawing. Filed May 4, 1965, Ser. No. 453,199
Claims priority, application Great Britain, May 14, 1964, 20,153/64
Int. Cl. C07f 7/02
U.S. Cl. 260—448.2
14 Claims

ABSTRACT OF THE DISCLOSURE

A process for the production of organosilicon compounds is disclosed, wherein a silicon compound containing at least one silicon-bonded hydrogen and an unsaturated compound which is not a primary or secondary amine, an aldehydic compound or a compound having a cyano group on an unsaturated carbon atom, are reacted together in the presence of a complex of a platinum II halide with a hydrocarbyl sulphide.

This invention relates to the production of organosilicon compounds and compositions containing same and more particularly to the production of such compounds and compositions by the reaction of a compound containing at least one silicon-bonded hydrogen atom with a compound containing at least one unsaturated linkage.

It is known that silicon compounds containing a silicon-bonded hydrogen atom can be reacted with certain compounds containing unsaturated linkages. For the carrying out of such reactions a number of catalysts have been used or proposed for use. These catalysts are, however, not always entirely satisfactory in use.

According to the present invention a process for the production of organosilicon compounds comprises reacting together a silicon compound containing at least one silicon-bonded hydrogen atom and an unsaturated compound, as hereinafter defined, in the presence of a complex of a platinum II halide with a compound of sulphur, phosphorus or nitrogen.

Any silicon compound containing at least one silicon atom having at least one and not more than two hydrogen atoms bonded directly thereto may be used in the process of our invention. The compound used may be, for example, a monomeric compound, a polymer, a copolymer or a mixture of such materials. Suitable materials which may be employed include halogenosilanes, organohalogenosilanes, organosilanes, organopolysilanes, organopolysiloxanes, organopolysilcarbanes and like structures. In these compounds the organo groups may be the same or different and may be, for example, alkyl groups, such as methyl, ethyl, propyl or butyl groups, cycloalkyl groups, such as cyclohexyl groups, aryl groups, such as phenyl groups, aralkyl groups, such as benzyl groups, alkaryl groups, such as tolyl groups or haloaryl groups such as mono- or di-chlorophenyl groups. It is, however, in many cases preferred that the organo groups should be methyl or phenyl groups. The organo groups may also be unsaturated aliphatic groups such as vinyl or allyl groups or unsaturated alicyclic groups such as cyclohexenyl groups. Examples of suitable compounds include methyldichlorosilane, dimethylchlorosilane, trichlorosilane, diphenylsilane, methylphenylchlorosilane, 1:4-bis(dimethylsilyl)benzene, 1:3:5:7-tetramethylcyclotetrasiloxane, di(trimethylsilyl)polymethylhydrogensiloxanes and siloxanes containing both dimethylsiloxanyl and methylhydrogensiloxanyl units.

When a silane is used it is preferred that it be a substituted silane of the general formula $R_bSiH_cX_{(4-b-c)}$ where R is a hydrocarbon group, X is a halogen atom or an alkoxy or aryloxy group, $b$ is 0, 1 or 2, $c$ is 1 or 2 and $b+c$ is not greater than 4. If a siloxane is used it is preferred that it should be a hydrolysis product of such a silane or a co-hydrolysis product of such a silane with one or more other silanes, for example, such as a diorganodihalogenosilane.

By the phrase "unsaturated compound" as used throughout this specification we mean any unsaturated compound containing at least one pair of carbon atoms linked by a multiple bond, other than a primary or secondary amine, an aldehydic compound or a compound having a cyano group on an unsaturated carbon atom. The unsaturated compound may, of course, be a monomeric compound or a polymeric compound or composition.

The unsaturated compound used may be a purely organic compound or may be an organometallic compound, for example, an organosilicon compound. For many purposes it is preferred that the unsaturated compound be a hydrocarbon. Suitable compounds which may be used include, for example, ethylene, propylene, butylene, octene-1, octene-2 and decene-1; acetylene and its homologues, phenylacetylene; diolefins such as butadiene, isoprene and its homologues; alkenynes such as vinylacetylene and divinylacetylene; alicyclic substances such as cyclopentene and cyclohexene, cyclohexadiene and cyclopentadiene; aralkenes such as styrene, ethylvinylbenzene and divinylbenzene, unsaturated polymers such as polybutadienes, polyisoprenes, sulphur vulcanisable polyisobutylenes and sulphur vulcanisable ethylene/propylene terpolymers i.e. polyisobutylene and ethylene/propylene copolymers containing small amounts of unsaturation introduced by copolymerisation with a diene; esters of unsaturated acids containing not more than 18 carbon atoms such as methyl or ethyl oleate, crotonate, acrylate or methacrylate, dimethyl itaconate, diethyl maleate, allyl methacrylate and diethylaminoethyl acrylate; esters of unsaturated alcohols such as vinyl acetate, allyl acetate, allyl benzoate, butenyl acetate, diallyl phthalate and diallylterephthalate; unsaturated ethers such as methyl vinyl ether, ethyl vinyl ether, chloroethyl vinyl ether, divinyl ether, butyl vinyl ether, diallyl ether, allyl glycidyl ether and allyl ethers of polyoxyalkylenes; unsaturated nitrogen-containing compounds not having a primary amino group, nor having a cyano group directly attached to an unsaturated carbon atom such as 2-methyl-5-vinylpyridine, 2-vinylpyridine, N-vinyl pyrollidone, N-allyl-p-toluenesulphonamide and allyl cyanide; unsaturated sulphur-containing compounds not containing a mercapto group such as allyl methyl sulphide and allyl methyl sulphone; unsaturated halogeno compounds such as vinyl chloride and allyl chloride; and organosilicon compounds such as vinyltrimethylsilane, allyltrimethylsilane, diallyldimethylsilane, diallyltetramethyldisiloxane and methylvinylpolysiloxanes having varying proportions of vinyl groups.

If desired the unsaturated group and the silicon-bonded hydrogen atom may be present in the same molecule, i.e., the silicon compound and the unsaturated compound are the same compound, in which case the reaction product is a polymeric material. If the starting molecule has only one silicon-bonded hydrogen atom and one unsaturated group a linear or cyclic polymer will be formed. Silanes suitable for this purpose include, for example, dimethylvinylsilane, diphenylvinylsilane, methylphenylvinylsilane, 1-(dimethylsilyl)-4-(dimethylvinylsilyl)benzene, allydimethylsilane, allylmethylphenylsilane and allyldiphenylsilane.

The platinum complexes which may be used in the process of our invention include those of the general formulae: $L_2PtX_2$, $(LPtX_2)_2$ and $LL'PtX_2$ in which the ligand or donor group L or L′ may be any group containing phosphorus, sulphur or nitrogen which can coordinate with the platinum atom and in which X is a halogen atom and which is preferably a chlorine atom. Suitable ligands include the hydrocarbyl phosphines, for example, such as trimethylphosphine, triethylphosphine, tripropylphosphine and diphenylphosphine, the hydrocarbyl sulphides, for example, such as diethylsulphide, ethylmercaptan and phenylmercaptan and nitriles, for example, such as benzonitrile, phthalonitrile and propionitrile. It is in many cases preferred that the complex should be a complex containing sulphur and cis-bis(diethylsulphide)dichloroplatinum II is particularly preferred. It is, however, frequently convenient to use this complex in admixture with the trans isomer which is not quite so active as the cis complex. These complexes may be prepared by any of the well known methods, for example, such as are described in "Inorganic Synthesis," vol. 6, p. 211 (McGraw-Hill New York, 1960: Ed. Rochow).

The proportion of platinum complex to the two reactants may vary widely, for example, from $10^{-8}$ to $10^{-2}$ mols (calculated as atoms of platinum) per mol of unsaturated reactant. It is, however, normally preferred to use proportions of the order of $10^{-6}$ to $10^{-4}$ mols per mol of unsaturated reactant.

The reaction may be carried out over a wide range of temperature and the optimum temperature will depend, in any specific case, on the nature of the reactants. It is normally convenient to carry out the reaction at a temperature not greater than 300° C., but the maximum temperature possible will be determined by the stability of the reactants and the desirability of avoiding thermal decomposition. In general it is preferred to initiate the reaction at a temperature within the range of from 10 to 150° C. and to maintain the temperature within this range during the course of the reaction.

The time required to complete the reaction will also depend on the specific reactants involved and on the reaction temperature and the catalyst and its concentration. Normally a reaction time of up to 8 hours is adequate and in many cases a substantially quantitative yield of product is obtained in a reaction time of the order of 30 minutes or less.

The reaction may be carried out at atmospheric or at superatmospheric pressure. The choice of pressure conditions will depend largely on the nature of the reactants, for example, in the case of nonvolatile reactants it may well be convenient to carry out the reaction at atmospheric pressure while in the case of reactants which are gaseous at ordinary temperatures reaction under superatmospheric pressure may well be more convenient.

Our invention is further illustrated by the following examples in which all parts and percentages are by weight.

EXAMPLE 1

A solution of 0.446 part of cis-bis(diethylsulphide)dichloroplatinum II in 10 parts of benzene was added to 150 parts of methylphenylvinylsilane (these proportions being equivalent to 1 atom of platinum per 1000 mols of silane). The temperature of the mixture rose from 22° C. to 130° C. within 15 seconds of mixing and over a period of 30 minutes slowly fell to 22° C. There was thus obtained 150 parts of a mixture of the cyclic dimer of the starting silane and linear polymers. This product was heated at 250° C. under a pressure of 0.1 mm. Hg for 60 minutes resulting in removal of 35 parts of volatile materials. The residue was a brittle tack-free polymer containing only a trace of silicon-bonded hydrogen.

EXAMPLE 2

0.446 part of trans-bis(diethylsulphide)dichloroplatinum II dissolved in 10 parts of benzene was added to 150 parts of methylphenylvinylsilane. The temperature of the mixture rose from 22° C. to 120° C. within 1 minute of mixing and slowly fell to 22° C. again over a period of 30 minutes. There was thus obtained a polymeric mixture similar to that obtained by the process of Example 1.

EXAMPLE 3

0.01 part of cis-bis(diethylsulphide)dichloroplatinum II dissolved in 1 part of benzene was added to a mixture of 34.5 parts of commercial stabilised vinyl acetate and 23.5 parts of methyldichlorosilane. The mixture was heated under reflux for 7 hours during which time the liquid temperature rose from 65 to 94° C. The mixture was then fractionally distilled and there was thus obtained 18.53 parts of unchanged vinyl acetate and 29.55 parts of the adduct $C_5H_{10}SiO_2Cl_2$, B.P. 75° C./10 mm. Hg.

EXAMPLE 4

0.01 part of bis(benzonitrile)dichloroplatinum II was dissolved in 10 parts of commercial divinylbenzene (consisting approximately of 4 parts of divinylbenzene and 6 parts of ethylvinylbenzene). 5 parts of tetramethylcyclotetrasiloxane were then added to the so obtained solution. The mixture was then heated to 100° C. for a period of 10 minutes. There was thus obtained 10 parts of a stiff rubbery polymer.

EXAMPLE 5

0.01 part of cis-bis(diethylsulphide)dichloroplatinum II dissolved in 0.2 part of benzene were added to 5 parts of a mixture prepared from 5 parts of a linear trimethylsilyl end-stopped polymethylsiloxane fluid containing 1.5 percent active hydrogen and of a viscosity 40 cs. at 25° C. and 100 parts of a linear trimethylsilyl end-stopped polymethyldisiloxane containing 0.2 mol percent methylvinylsiloxanyl groups and having an average molecular weight of 700,000. The mixture was heated at 120° C. for 5 minutes and there was thus obtained a benzene insoluble elastomeric material.

EXAMPLE 6

A mixture of 23.5 parts of methyldichlorosilane, 28.0 parts of decene-1, 50 parts of toluene and 0.0045 part of cis-bis(diethylsulphide)dichloroplatinum II, was heated to reflux, whereupon a violent exothermic reaction occurred. When the reaction had subsided the mixture was heated under reflux for a further 1½ hours. Fractional distillation of the mixture gave 35.2 parts of a colourless mobile liquid, B.P. 79–82° C./0.3 mm. Hg whose I.R. spectrum showed the absence of both ≡SiH groups and olefinic unsaturation.

EXAMPLE 7

A mixture of 22.6 parts of diallylphthalate, 44.4 parts of Sym. heptamethyltrisiloxane, $[(CH_3)_3SiO]_2Si(CH_3)H$, and 0.0045 part of cis-bis(diethylsulphide)dichloroplatinum II was heated to reflux. An exothermic reaction took place. Fractional distillation of the resulting mixture gave 46.8 parts of a colourless mobile oil, B.P. 150–156°/0.1 mm. Hg which was free of elefinic unsaturation and silanic hydrogen.

EXAMPLE 8

0.043 part of dichloro-bis(tripropylphosphine)-µ-dichloroplatinum II, $[(n.C_3H_7)_3P.PtCl_2]_2$ was added to 158 parts of methylphenylvinylsilane. A slow rise in temperature of the mixture occurred over 15 minutes, followed by a more rapid rise to about 150° C. A mixture of linear and cyclic polymers similar to that described in Example 1 was thereby obtained.

What we claim is:

1. A process for the production of organosilicon compounds comprising reacting together at a temperature not greater than about 300° C. a silicon compound containing at least one silicon-bonded hydrogen and an ethylenically unsaturated compound and not being a primary or secondary amine, an aldehydic compound or a compound having a cyano group on an unsaturated carbon atom in the presence of a complex of a platinum II halide with a hydrocarbyl sulphide, the complex being present in amount from about $10^{-8}$ to about $10^{-2}$ mols per mol of unsaturated compound.

2. A process according to claim 1 wherein the silicon compound is an organosilicon compound and the organo groups are selected from the group consisting of methyl, ethyl, propyl, butyl, cyclohexyl, phenyl, benzyl, tolyl, mono- and di-chlorophenyl groups.

3. A process according to claim 1 wherein the silicon compound is selected from the group consisting of methyldichlorosilane, dimethylchlorosilane, trichlorosilane, diphenylsilane, methylphenylchlorosilane, 1:4-bis(dimethylsilyl)benzene, 1:3:5:7-tetramethylcyclotetrasiloxane, di-(tri-methsilyl)polymethylhydrogensiloxanes and siloxanes containing both dimethylsiloxanyl and methylhydrogensiloxanyl units.

4. A process according to claim 1 wherein the silicon compound is a silane of the general formula $R_bSiH_cX_{(4-b-c)}$ where R is a hydrocarbon group, X is selected from the group consisting of halogen atoms, alkoxy and aryloxy groups, $b$ is 0, 1 or 2, $c$ is 1 or 2 and $b+c$ is not greater than 4.

5. A process according to claim 1 wherein the silicon compound is a siloxane selected from the group consisting of hydrolysis product of a silane of the general formula $R_bSiH_cX_{(4-b-c)}$ where R is a hydrocarbon group, X is selected from the group consisting of halogen atoms, alkoxy and aryloxy groups, $b$ is 0, 1 or 2, $c$ is 1 or 2 and $b+c$ is not greater than 4, and cohydrolysis product of such a silane and at least one other silane.

6. A process according to claim 1 wherein the halide is a chloride.

7. A process according to claim 1 wherein the hydrocarbyl sulphide is selected from the group consisting of diethylsulphide, ethylmercaptan and phenylmercaptan.

8. A process according to claim 1 wherein the complex is used in the amount from about $10^{-6}$ to about $10^{-4}$ mols per mol of unsaturated compound.

9. A process according to claim 1 wherein the silicon compound is selected from the group consisting of halogenosilanes, organohalogenosilanes, organosilanes, organopolysilanes, organopolysiloxanes and organopolysilcarbanes.

10. A process according to claim 5 wherein at least one of the said other silanes is a diorganodihalogenosilane.

11. A process according to claim 1 wherein the unsaturated compound is a hydrocarbon.

12. A process according to claim 1 wherein the silicon compound and the unsaturated compond are the same compound.

13. A process according to claim 7 wherein the complex is cis-bis(diethylsulphide)dichloroplatinum II.

14. A process according to claim 1 wherein the reaction is initiated and carried out at a temperature of from about 10 to about 150° C.

References Cited

UNITED STATES PATENTS

| | | | |
|---|---|---|---|
| 3,167,573 | 1/1965 | Nitzsche et al. | 260—448.2 |
| 3,188,299 | 6/1965 | Chalk | 260—46.5 XR |
| 3,188,300 | 6/1965 | Chalk | 260—46.5 XR |

TOBIAS E. LEVOW, *Primary Examiner.*

J. P. PODGORSKI, *Assistant Examiner.*